(12) United States Patent
Li

(10) Patent No.: US 10,484,974 B2
(45) Date of Patent: Nov. 19, 2019

(54) UPLINK RESOURCE CONFIGURATION METHOD, UPLINK TRANSMISSION METHOD, UPLINK RESOURCE CONFIGURATION APPARATUS, AND UPLINK TRANSMISSION APPARATUS

(71) Applicant: Beijing Zhigu Tech Co., Ltd., Beijing (CN)

(72) Inventor: Yong Li, Beijing (CN)

(73) Assignee: BEIJING ZHIGU TECH CO., LTD., Beijing (CN)

(*) Notice: Subject to any disclaimer, the term of this patent is extended or adjusted under 35 U.S.C. 154(b) by 28 days.

(21) Appl. No.: 15/234,051

(22) Filed: Aug. 11, 2016

(65) Prior Publication Data

US 2017/0064686 A1 Mar. 2, 2017

(30) Foreign Application Priority Data

Aug. 31, 2015 (CN) .......................... 2015 1 0548627

(51) Int. Cl.
*H04W 72/04* (2009.01)
(52) U.S. Cl.
CPC .... *H04W 72/0406* (2013.01); *H04W 72/0446* (2013.01)
(58) Field of Classification Search
CPC ......... H04W 72/0406; H04W 72/0446; H04W 72/04; H04W 72/12

(Continued)

(56) References Cited

U.S. PATENT DOCUMENTS 8,208,416 B2* 6/2012 Suzuki .................... H04W 4/20
370/310
8,243,634 B2* 8/2012 Haartsen .............. H04B 7/2681
370/280

(Continued)

FOREIGN PATENT DOCUMENTS

CN 102075310 A 5/2011
CN 102804625 A 11/2012

(Continued)

*Primary Examiner* — Man U Phan
(74) *Attorney, Agent, or Firm* — Sheppard Mullin Richter & Hampton LLP

(57) ABSTRACT

Embodiments of the present application disclose an uplink resource configuration method, an uplink transmission method, an uplink resource configuration apparatus, and an uplink transmission apparatus. The uplink resource configuration method comprises: determining a first uplink resource configuration associated with a first carrier that performs at least partial uplink transmission with at least one user equipment, wherein the first carrier comprises: respective some uplink sub-frames of at least two physical carriers, and the first carrier is continuous in time; and sending first configuration information associated with the first uplink resource configuration. By means of the methods and the apparatuses in the embodiments of the present application, a quantity of carriers used for uplink transmission is increased, so that a problem that an uplink transmission resource is limited can be resolved; and in addition, the carriers used for uplink transmission are formed by uplink sub-frames of different physical carriers that are continuous in time, and therefore a timing relationship needed by an uplink carrier can be satisfied, and then a system can run normally.

25 Claims, 6 Drawing Sheets

(58) Field of Classification Search
USPC .................................. 370/252–280, 310–336
See application file for complete search history.

(56) References Cited

U.S. PATENT DOCUMENTS

| | | | | |
|---|---|---|---|---|
| 8,441,970 | B1* | 5/2013 | Suzuki | H04W 4/20 370/310 |
| 8,570,977 | B2* | 10/2013 | Damnjanovic | H04W 36/0055 370/331 |
| 8,599,738 | B2* | 12/2013 | Lin | H04L 1/0001 370/315 |
| 8,743,802 | B2* | 6/2014 | Anderson | H04W 76/068 370/329 |
| 8,755,340 | B2* | 6/2014 | Anderson | H04W 72/042 370/329 |
| 8,891,418 | B2* | 11/2014 | Suzuki | H04W 4/20 370/310 |
| 9,191,825 | B2* | 11/2015 | Ning | H04B 7/2643 |
| 9,603,100 | B2* | 3/2017 | Ouchi | H04W 52/146 |
| 9,780,941 | B2* | 10/2017 | Suzuki | H04L 5/0057 |
| 9,794,845 | B2* | 10/2017 | Hwang | H04L 5/00 |
| 9,854,576 | B2* | 12/2017 | Ouchi | H04W 72/042 |
| 9,924,396 | B2* | 3/2018 | Takahashi | H04W 24/10 |
| 10,021,708 | B2* | 7/2018 | Li | H04W 28/0236 |
| 10,122,521 | B2* | 11/2018 | Ziren | H04L 5/14 |
| 10,218,485 | B2 | 2/2019 | Yoon et al. | |
| 2012/0281600 | A1 | 11/2012 | Tseng et al. | |
| 2013/0100938 | A1* | 4/2013 | Kwon | H04L 27/2655 370/336 |
| 2015/0085797 | A1 | 3/2015 | Ji et al. | |
| 2015/0201418 | A1* | 7/2015 | Zhang | H04W 76/38 370/329 |
| 2016/0100397 | A1* | 4/2016 | Wen | H04W 72/1284 |
| 2016/0192355 | A1* | 6/2016 | Yu | H04B 7/2656 370/280 |
| 2017/0048040 | A1* | 2/2017 | Zhang | H04B 7/2621 |
| 2017/0064686 | A1* | 3/2017 | Li | H04W 72/0406 |
| 2017/0273069 | A1* | 9/2017 | Tenny | H04W 36/0072 |
| 2017/0280467 | A1* | 9/2017 | Zhu | H04W 72/0426 |
| 2017/0302350 | A1* | 10/2017 | Liu | H04W 16/00 |
| 2017/0303066 | A1* | 10/2017 | Deng | H04W 4/70 |
| 2019/0104516 | A1* | 4/2019 | Oh | H04L 5/00 |

FOREIGN PATENT DOCUMENTS

| | | |
|---|---|---|
| CN | 103718498 A | 4/2014 |
| CN | 104579589 A | 4/2015 |

* cited by examiner

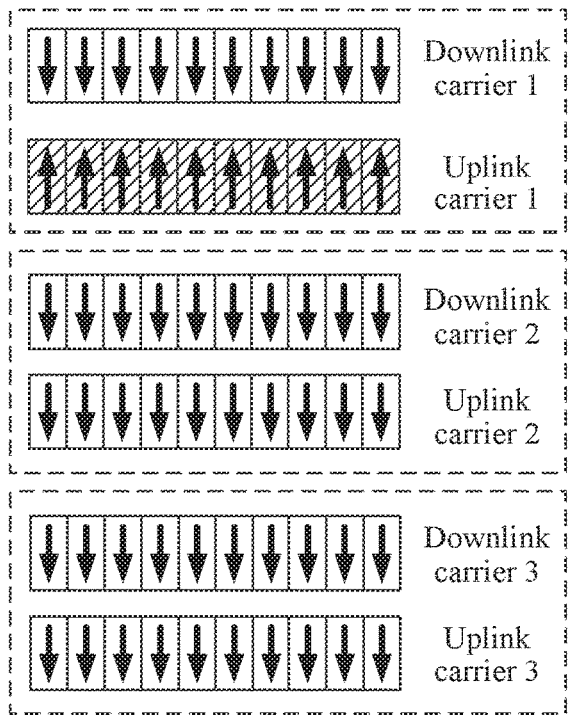
FIG. 1 (--Prior Art--)
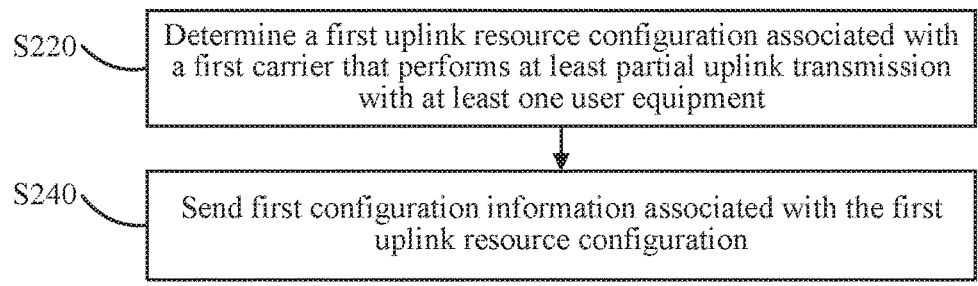
FIG. 2(a)

UPLINK RESOURCE CONFIGURATION METHOD, UPLINK TRANSMISSION METHOD, UPLINK RESOURCE CONFIGURATION APPARATUS, AND UPLINK TRANSMISSION APPARATUS

TECHNICAL FIELD

The present application relates to the field of communications technologies, and in particular, to an uplink resource configuration method, an uplink transmission method, an uplink resource configuration apparatus, and an uplink transmission apparatus.

BACKGROUND

With rapid development of mobile Internet services, a characteristic of uplink-downlink asymmetry for a mobile communications service is becoming obvious. For a high-bandwidth service such as an online video, a downlink traffic volume is far greater than an uplink traffic volume. Therefore, a mobile communications network assumes a contradictory characteristic of "downlink resources being scanty and uplink resources being more than needed". Configuration of asymmetry between uplink and downlink timeslot resources can be implemented in a time division duplexing (TDD) manner, and the contradiction brought by asymmetry between the uplink and the downlink of a service can be reduced to an extent. However, limitations of a TDD system in aspects such as coverage and high-speed moving, and hysteresis quality of the TDD system in actual industrialization and internationalization processes cause a standardization organization such as the 3GPP to begin to emphasize how to implement, on the basis of frequency division dual (FDD), a flexible configuration of uplink and downlink resources.

In the $67^{th}$ RAN plenum held in March in 2015, companies such as LG, China Telecom, Huawei, and Hisilicon jointly put forward a new project proposal of flexible duplex. This proposal claims that, flexible allocation of the uplink and downlink resources may be implemented by transmitting downlink data in some sub-frames on an uplink carrier of the FDD. FIG. 1 shows a solution of flexible allocation of frequency domain resources. By means of a method similar to carrier aggregation (CA), control-and-feedback-related information is transmitted by using a primary carrier, that is, a Primary Cell (Pcell), wherein the information is information such as physical uplink control channel (PUCCH) information (which comprises, for example, Acknowledgment/Negative Acknowledgement (ACK/NACK), a channel quality indicator (CQI), a precoding matrix indicator (PMI), and a rank indication (RI)) of all carriers. For example, a carrier 1 may be configured as a Pcell, and then control-and-feedback-related information of carriers 1/2/3 is transmitted by using an uplink carrier of the carrier 1. However, such a configuration method causes a load problem of the control-and-feedback-related information on the uplink carrier of the Pcell to be more serious. The reason for this is that: actually resources of five carriers (a downlink carrier 1, a downlink carrier 2, an uplink carrier 2, an downlink carrier 3, and an uplink carrier 3 that are shown in FIG. 1) are allocated for downlink transmission, and therefore the uplink carrier of the Pcell needs to bear feedback messages that are from the five carriers; second, only an uplink carrier that has a complete uplink sub-frame can be configured as the Pcell, and all user equipments can uses only the uplink carrier of the carrier 1 as an uplink Pcell, and therefore control-and-feedback-related information of all user equipments of an entire cell are borne by the same uplink carrier. In summary, according to a conventional Pcell configuration method, in an FDD flexible duplex system, an uplink carrier configured as a Pcell bear control-and-feedback-related information corresponding to all downlink sub-frames of all user equipments, which causes corresponding uplink feedback overheads to be extremely high.

SUMMARY

In view of this, an objective of embodiments of the present application is to provide an uplink resource configuration solution that effectively resolves a problem that an uplink resource is limited in a conventional FDD flexible duplex system that is based on carrier aggregation.

To achieve the foregoing objective, according to a first aspect of the embodiments of the present application, an uplink resource configuration method is provided, wherein the method comprises:

determining a first uplink resource configuration associated with a first carrier that performs at least partial uplink transmission with at least one user equipment, wherein the first carrier comprises: respective some uplink sub-frames of at least two physical carriers, and the first carrier is continuous in time; and sending first configuration information associated with the first uplink resource configuration.

According to a second aspect of the embodiments of the present application, an uplink transmission method is provided, wherein the method comprises:

acquiring first configuration information associated with a first uplink resource configuration associated with a first carrier that performs at least partial uplink transmission, wherein the first carrier comprises: respective some uplink sub-frames of at least two physical carriers, and the first carrier is continuous in time; and performing the at least partial uplink transmission at least according to the first uplink resource configuration.

According to a third aspect of the present application, an uplink resource configuration apparatus is provided, wherein the apparatus comprises:

a first determining module, configured to determine a first uplink resource configuration associated with a first carrier that performs at least partial uplink transmission with at least one user equipment, wherein the first carrier comprises: respective some uplink sub-frames of at least two physical carriers, and the first carrier is continuous in time; and a first sending module, configured to send first configuration information associated with the first uplink resource configuration.

According to a fourth aspect of the present application, an uplink transmission apparatus is provided, wherein the apparatus comprises:

a first acquiring module, configured to acquire first configuration information associated with a first uplink resource configuration associated with a first carrier that performs at least partial uplink transmission, wherein the first carrier comprises: respective some uplink sub-frames of at least two physical carriers, and the first carrier is continuous in time; and a first transmission module, configured to perform the at least partial uplink transmission at least according to the first uplink resource configuration.

According to a fifth aspect of the present application, an uplink resource configuration apparatus is provided, wherein the apparatus comprises:

a transceiver;

a memory, configured to store an instruction; and a processor, configured to execute the instruction stored in the memory, wherein the instruction makes the processor perform the following steps:

determining a first uplink resource configuration associated with a first carrier that performs at least partial uplink transmission with at least one user equipment, wherein the first carrier comprises: respective some uplink sub-frames of at least two physical carriers, and the first carrier is continuous in time; and sending, by using the transceiver, first configuration information associated with the first uplink resource configuration.

According to a sixth aspect of the present application, an uplink transmission apparatus is provided, wherein the apparatus comprises:

a transceiver;

a memory, configured to store an instruction; and a processor, configured to execute the instruction stored in the memory, wherein the instruction makes the processor perform the following steps:

acquiring, by using the transceiver, first configuration information associated with a first uplink resource configuration associated with a first carrier that performs at least partial uplink transmission, wherein the first carrier comprises: respective some uplink sub-frames of at least two physical carriers, and the first carrier is continuous in time; and performing, by using the transceiver, the at least partial uplink transmission at least according to the first uplink resource configuration.

By means of the methods and the apparatuses in the embodiments of the present application, a quantity of carriers used for uplink transmission is increased, so that a problem that an uplink transmission resource is limited can be resolved; and in addition, the carriers used for uplink transmission are formed by uplink sub-frames of different physical carriers that are continuous in time, and therefore a timing relationship needed by an uplink carrier can be satisfied, and then a system can run normally.

BRIEF DESCRIPTION OF THE DRAWINGS

FIG. 1 is a schematic diagram of a conventional flexible frequency domain resource allocation solution;

FIG. 2(a) is a flowchart of an example of an uplink resource configuration method according to an embodiment of the present application;

DETAILED DESCRIPTION

Figure 2B:
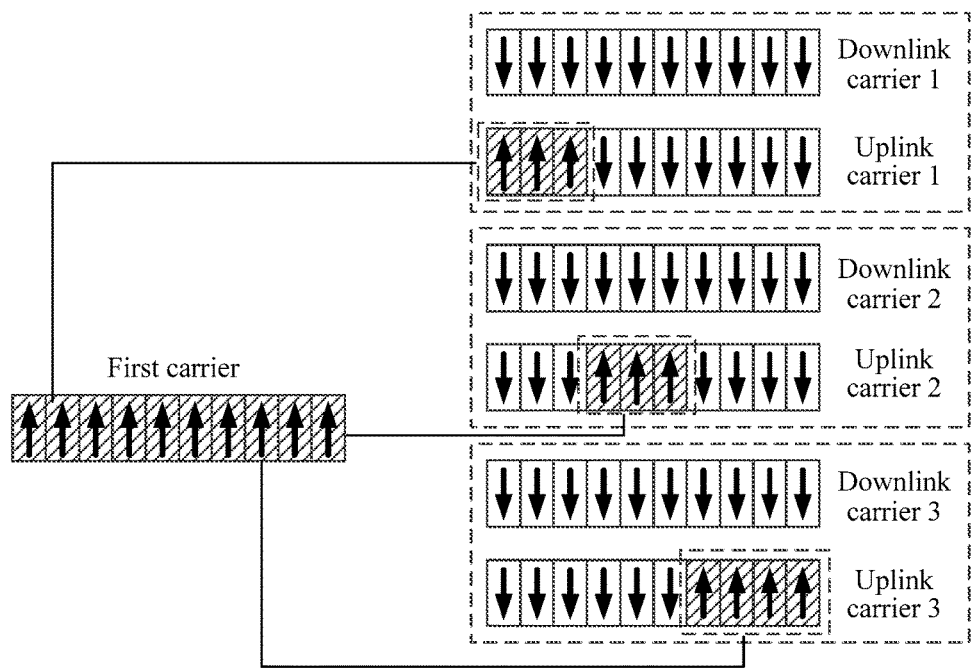
FIG. 2(b) to FIG. 2(e) are schematic formation diagrams of several examples of first carriers used in an uplink resource configuration method according to an embodiment of the present application.

The following further describes specific implementing manners of the present invention in detail with reference to the accompanying drawings and embodiments. The following embodiments are intended to describe the present invention, but not to limit the scope of the present invention.

A person skilled in the art may understand that, terms such as "first" and "second" in the present application are used only to distinguish different devices, modules, parameters, or the like. The terms neither represent any particular technical meaning, nor indicate an inevitable logical sequence between them.

In addition, all physical carriers referred to in the embodiments of the present application refer to FDD carriers. A conventional FDD carrier performs uplink and downlink transmission in symmetrical frequency bands, and such frequency bands are separately referred to as an uplink carrier and a downlink carrier.

FIG. 2(a) is a flowchart of an example of an uplink resource configuration method according to an embodiment of the present application. The method may be executed by any cell base station in a serving cell, comprising a Macrocell base station (which is also referred to as a macro base station) and a Small Cell base station (which is also referred to as a small base station), wherein the small base station comprises a home base station (which is also referred to as Femtocell), a Picocell base station, a Micocell base station, a macro cell, and a small cell. Therefore, the macro base station and the small base station are relative, and may be distinguished only by coverage. A macro base station whose coverage is relatively small may also be a small base station within coverage of a macro base station whose coverage is relatively large.

As shown in FIG. 2(a), the uplink resource configuration method provided in the embodiment of the present application comprises:

S220: Determine a first uplink resource configuration associated with a first carrier that performs at least partial uplink transmission with at least one user equipment, wherein the first carrier comprises: respective some uplink sub-frames of at least two physical carriers, and the first carrier is continuous in time.

S240: Send first configuration information associated with the first uplink resource configuration.

In the method in this embodiment, a carrier resource, that is, a first carrier, used for the at least one user equipment to perform the at least partial uplink transmission is flexibly configured. Specifically, the respective some uplink subframes of the at least two physical carriers are connected in series into an uplink carrier that is continuous in time, and other some uplink sub-frames on respective uplink carrier of the at least two physical carriers are still used for downlink transmission. Compared with a conventional primary carrier (Pcell), the uplink carrier (first carrier) that is continuous in time and that is formed in this way may also be referred to as a virtual Pcell. A quantity of uplink transmission resources are increased by increasing a quantity of Pcells. Therefore, while a problem that an uplink resource is limited is resolved, the virtual Pcell that is formed by uplink sub-frames that are from different physical carriers are continuous in time; and for a physical carrier that forms such a virtual Pcell, some sub-frames on an uplink carrier of the physical carrier are still used for downlink transmission, and therefore in such downlink transmission, an uplink sub-frame that can satisfy a timing relationship of an uplink feedback needing to be transmitted can be found anyhow from the virtual Pcell. Such a timing relationship may be: for example, for a downlink sub-frame, an ACK/NACK message for the downlink sub-frame should be transmitted after four sub-frames of the downlink sub-frame by using an uplink sub-frame. In the method in this embodiment, an uplink sub-frame used for transmitting such an ACK/NACK message can always be found from the virtual Pcell.

In summary, by means of the method in this embodiment of the present application, a quantity of carriers used for uplink transmission is increased, so that a problem that an uplink transmission resource is limited can be resolved; and in addition, the carriers used for uplink transmission are formed by uplink sub-frames of different physical carriers that are continuous in time, and therefore a timing relationship needed by an uplink carrier can be satisfied, and then a system can run normally.

It should be noted that, according to different roles of an apparatus for executing the method in this embodiment, the at least one user equipment may comprise at least one user equipment within coverage of a macro base station, or comprise at least one user equipment within coverage of at least one small base station.

Figure 2C:
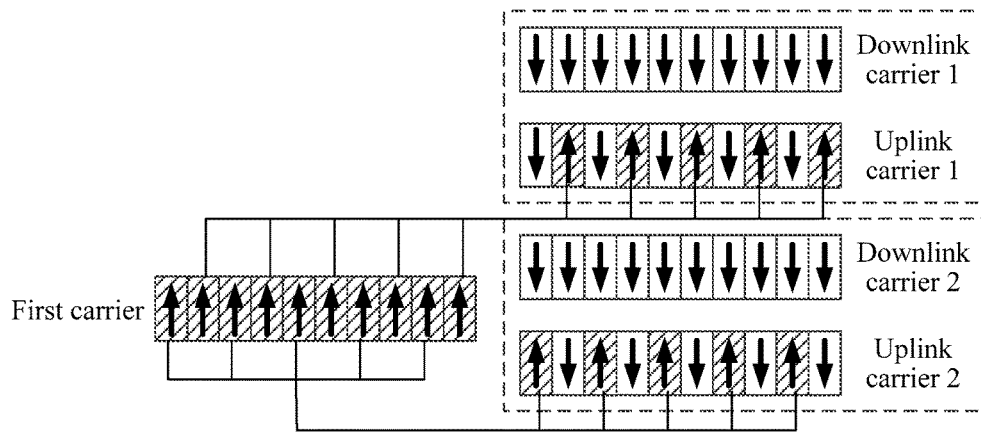
Figure 2D:
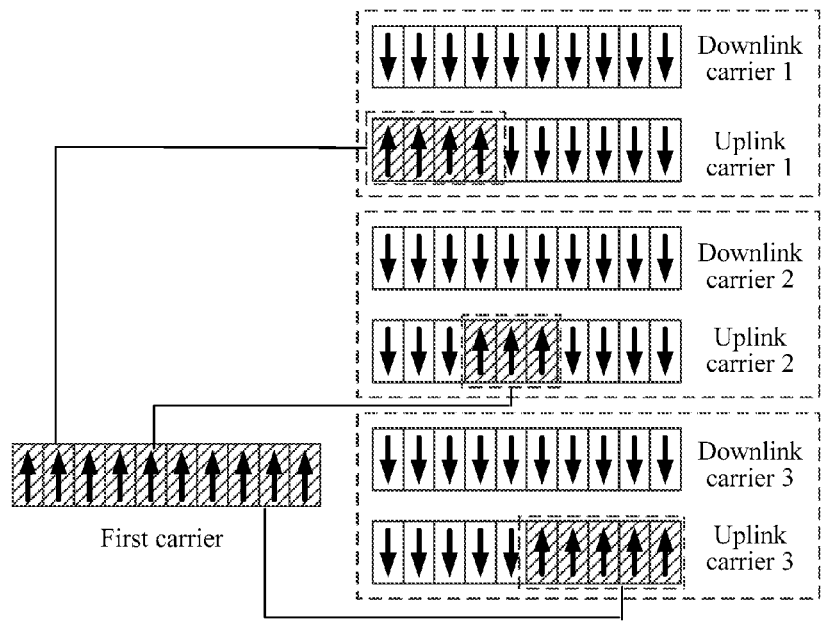

In addition, optionally, a manner in which a first carrier is formed may be shown in FIG. 2(b). Uplink sub-frames that are from the shown at least two physical carriers form, in a series connection manner, a first carrier that is continuous in time. As shown in FIG. 2(b), a first to a third uplink sub-frames (filled with left diagonal stripes) of an uplink carrier 1, a fourth to a sixth uplink sub-frames (filled with left diagonal stripes) of an uplink carrier 2, and a seventh to a tenth uplink sub-frames of an uplink carrier 3 form the first carrier that is continuous in time, all of the rest uplink sub-frames of the uplink carriers 1, 2, and 3 are used for downlink transmission. The manner in which the first carrier is formed may also be shown in FIG. 2(c). Uplink sub-frames that are from the at least two physical carriers form, in an interspersed connection (in a shape of comb teeth) manner, a first carrier that is continuous in time. As shown in FIG. 2(c), a second, a fourth, a sixth, an eighth, and a tenth uplink sub-frames of an uplink carrier 1 and a first, a third, a fifth, a seventh, and a ninth uplink sub-frames of an uplink carrier 2 form the first carrier that is continuous in time, and the rest uplink sub-frames of the uplink carriers 1 and 2 are used for downlink transmission. The manner in which the first carrier is formed may also be any other manner, which needs only to ensure that the first carrier is continuous in time, and the "being continuous in time" means that ten sub-frames that forms one radio frame of the first carrier may correspond to one uplink sub-frame of one or more physical carriers of the at least two physical carriers. As shown in FIG. 2(d), a fourth uplink sub-frame of the first carrier corresponds to a fourth uplink sub-frame of uplink carriers 1 and 2, and a sixth uplink sub-frame of the first carrier corresponds to a sixth uplink sub-frame of uplink carriers 2 and 3. Preferably, the respective some uplink sub-frames of the at least two physical carriers comprised in the first carrier do not overlap in time, so as to prevent control overheads that may be needed due to time overlapping, as shown in FIG. 2(c) and FIG. 2(d).

In the method in this embodiment, uplink transmission that uses the first carrier generally comprises: transmission of feedback-associated information, for example, an ACK/NACK message. In addition, a semi-persistent scheduling (SPA) resource and a physical random access channel (PRACH) resource further need to be configured on a conventional Pcell, and transmission of such information is also faced with a problem that the resources are limited. Therefore, in the method in this embodiment, uplink transmission for which a first carrier is used may also comprise transmission of information associated with SPS and PRACH. The first carrier may also be used, according to traffic statuses of carriers, for partial transmission of other information related to control.

It should be further noted that, in step S220, the first carrier may be determined at least according to the traffic statuses of the carriers. For example, generally a carrier resource of a small base station whose frequency is relatively high is selected to form the first carrier, where such carrier resource of the small base station is relatively flexible. In addition, in step S220, the related configuration of the first carrier may be determined according to the traffic statuses of the carriers and a service requirement of the user equipment when the user equipment accesses the base station (macro base station/small base station), and according to different roles for executing the method in this embodiment, the traffic statuses of the carriers may be determined in a manner of communication with another base station (macro base station/small base station).

After the first uplink resource configuration is determined, optionally, in step S240, the first configuration information may be sent in a broadcast manner; or the first configuration information may be directly sent to the at least one user equipment. For example, the first configuration information may be sent to the at least one user equipment in a manner of higher layer signaling, where the higher layer signaling is, for example, radio resource control (RRC) signaling; or the first configuration information may be sent to the at least one user equipment by using a cell base station in which the at least one user equipment is located.

In a configuration solution for the conventional Pcell, generally a carrier of a macro base station is used as a primary carrier to perform control-related or feedback-related uplink transmission, this is because a frequency of a carrier resource of the macro base station is relatively low, and a transmission range is relatively broad. However, compared with uplink transmission of a feedback-related message, for uplink transmission of a control-related message, a transmission frequency is relatively low, and flexibility is not very high. Based on such a reason, in an optional implementing manner of this embodiment, the configuration of the primary carrier (which is referred to as a second carrier in the following) in the configuration solution for the conventional Pcell may still be retained, and the second carrier may be used to bear at least partial message control-related uplink transmission. In such an implementing manner, the method in this embodiment further comprises:

S230: Determine a second uplink resource configuration associated with a second carrier that performs at least partial uplink transmission with at least one user equipment, wherein the second carrier comprises: all uplink sub-frames of at least one physical carrier.

Figure 2E:
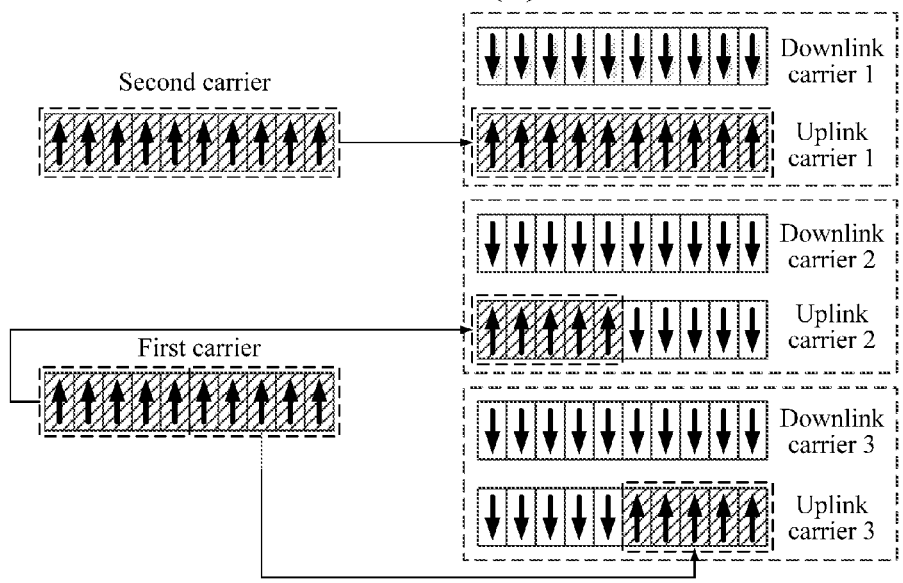

As shown in FIG. 2(e), the uplink carrier 1 and the uplink carrier 2 are macro base station carriers, it is determined that all uplink sub-frames of the uplink carrier 2 are second carriers, and are used to bear at least partial control-related message uplink transmission for all user equipments. First five sub-frames of the uplink carrier 2 and last five sub-frames of the uplink carrier 3 are used as the first carrier, and are used for uplink transmission except the uplink transmission borne by the second carrier.

It should be noted that, the uplink transmission borne by the first carrier and the second carrier may dynamically change according to traffic of the carriers.

S250: Send second configuration information associated with the second uplink resource configuration.

Similar to the sending of the first configuration information, in step S250, the second configuration information may be sent in a broadcast manner; or the second configuration information is directly sent to the at least one user equipment; or the second configuration information is sent to the at least one user equipment by using a cell base station in which the at least one user equipment is located.

In summary, by means of the method in this embodiment, a problem that an uplink resource is limited can be effectively resolved, and a resource configuration process is simple.

Figure 3:
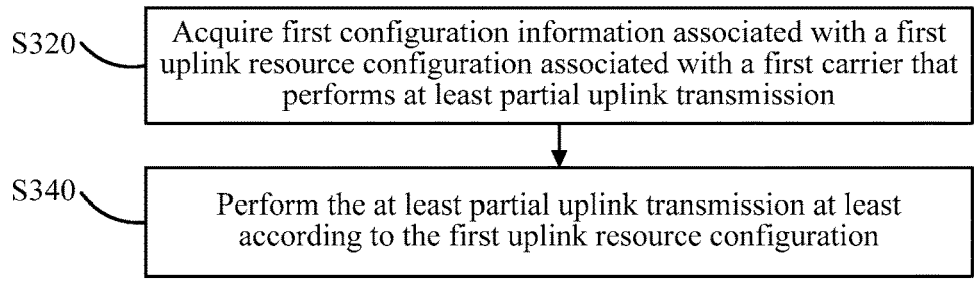
FIG. 3 is a flowchart of an example of an uplink transmission method according to an embodiment of the present application.

FIG. 3 is a flowchart of an example of an uplink transmission method according to an embodiment of the present application. The method may be executed by any user equipment. As shown in FIG. 3, the method comprises:

S320: Acquire first configuration information associated with a first uplink resource configuration associated with a first carrier that performs at least partial uplink transmission, wherein the first carrier comprises: respective some uplink sub-frames of at least two physical carriers, and the first carrier is continuous in time.

S340: Perform the at least partial uplink transmission at least according to the first uplink resource configuration.

With reference to the description in FIG. 2(a), in the method in this embodiment, the carrier resource, that is, the first carrier, for the user equipment to perform the at least partial uplink transmission is flexibly configured for the base station, and the user equipment is notified in a form of the first configuration information associated with the first uplink resource configuration associated with the first carrier. In step S320, such first configuration information is acquired. In step S340, the at least partial uplink transmission is performed according to the first configuration information. In the method in this embodiment, uplink transmission that uses the first carrier generally comprises: transmission of feedback-associated information, for example, an ACK/NACK message. In addition, an SPA resource and a PRACH resource further need to be configured on a conventional Pcell, and transmission of such information is also faced with a problem that the resources are limited. Therefore, in the method in this embodiment, uplink transmission for which a first carrier is used may also comprise transmission of information associated with SPS and PRACH. The first carrier may also be used, according to traffic statuses of carriers, for partial transmission of other information related to control. In addition, such uplink transmission may occur at any time before a next configuration takes effect.

Still with reference to the description in FIG. 2(a), in an optional implementing manner of this embodiment, the configuration of the primary carrier (that is, a second carrier) in the configuration solution for the conventional Pcell may still be retained, and the second carrier may be used to bear at least partial message control-related uplink transmission. In such an implementation manner, the method in this embodiment further comprises:

S330: Acquire second configuration information associated with a second uplink resource configuration associated with a second carrier that performs at least partial uplink transmission, wherein the second carrier comprises: all uplink sub-frames of at least one physical carrier.

S350: Perform uplink transmission by using the second carrier according to a traffic status on the first carrier.

It should be noted that, the uplink transmission borne by the first carrier and the second carrier may dynamically change according to traffic of the carriers.

A person skilled in the art may understand that, in the foregoing method in specific implementing manners of the present application, the value of the serial number of each step described above does not mean an execution sequence, and the execution sequence of each step should be determined according to the function and internal logic thereof, and should not be any limitation on the implementation procedure of the embodiments of the present application.

In addition, an embodiment of the present application further provides a computer-readable medium, comprising a computer-readable instruction that is executed to perform the following operations: the operations in the steps in the implementing manners shown in FIG. 2.

In addition, an embodiment of the present application further provides a computer-readable medium, comprising a computer-readable instruction that is executed to perform the following operations: the operations in the steps in the implementing manners shown in FIG. 3.

Figure 4A:
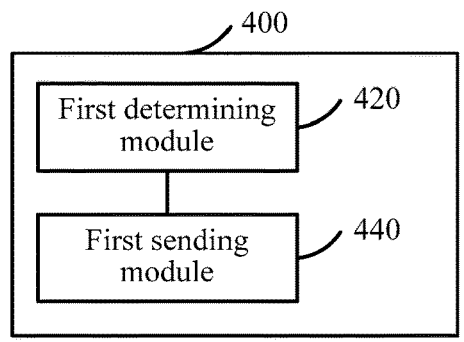
FIG. 4(a) and FIG. 4(b) are structural block diagrams of two examples of an uplink resource configuration apparatus according to an embodiment of the present application.

FIG. 4(a) is a structural block diagram of an example of an uplink resource configuration apparatus according to an embodiment of the present application. The apparatus may be or belong to any cell base station in a serving cell, comprising a Macrocell base station (which is also referred to as a macro base station) and a Small Cell base station (which is also referred to as a small base station), wherein the small base station comprises a home base station (which is also referred to as Femtocell), a Picocell base station, a Micocell base station, a macro cell, and a small cell. Therefore, the macro base station and the small base station are relative, and may be distinguished only by coverage. A macro base station whose coverage is relatively small may also be a small base station within coverage of a macro base station whose coverage is relatively large.

As shown in FIG. 4(a), the uplink resource configuration apparatus 400 provided in the embodiment of the present application comprises:

a first determining module 420, configured to determine a first uplink resource configuration associated with a first carrier that performs at least partial uplink transmission with at least one user equipment, wherein the first carrier comprises: respective some uplink sub-frames of at least two physical carriers, and the first carrier is continuous in time; and a first sending module 440, configured to send first configuration information associated with the first uplink resource configuration.

In the apparatus in this embodiment, a carrier resource, that is, a first carrier, used for the at least one user equipment to perform the at least partial uplink transmission is flexibly configured. Specifically, the respective some uplink sub-frames of the at least two physical carriers are connected in series into uplink carriers that are continuous in time, and other some uplink sub-frames on respective uplink carrier of the at least two physical carriers are still used for downlink transmission. Compared with a conventional primary carrier (Pcell), the uplink carrier (first carrier) that is continuous in time and that is formed in this way may also be referred to as a virtual Pcell. A quantity of uplink transmission resources are increased by increasing a quantity of Pcells. Therefore, while a problem that an uplink resource is limited is resolved, the virtual Pcell that is formed by uplink sub-frames that are from different physical carriers are continuous in time; and for a physical carrier that forms such a virtual Pcell, some sub-frames on an uplink carrier of the physical carrier are still used for downlink transmission, and therefore in such downlink transmission, an uplink sub-frame that can satisfy a timing relationship of an uplink feedback needing to be transmitted can be found anyhow from the virtual Pcell. Such a timing relationship may be: for example, for a downlink sub-frame, an ACK/NACK message for the downlink sub-frame should be transmitted after four sub-frames of the downlink sub-frame by using an uplink sub-frame. In the method in this embodiment, an uplink sub-frame used for transmitting such an ACK/NACK message can always be found from the virtual Pcell.

In summary, by means of the apparatus in this embodiment of the present application, a quantity of carriers used for uplink transmission is increased, so that a problem that an uplink transmission resource is limited can be resolved; and in addition, the carriers used for uplink transmission are formed by uplink sub-frames of different physical carriers that are continuous in time, and therefore a timing relationship needed to perform uplink transmission can be satisfied, and then a system can run normally.

It should be noted that, according to different roles of an apparatus in this embodiment, the at least one user equipment may comprise at least one user equipment within coverage of a macro base station, or comprise at least one user equipment within coverage of at least one small base station.

In addition, optionally, a manner in which a first carrier is formed may be shown in FIG. 2(*b*). Uplink sub-frames that are from the shown at least two physical carriers form, in a series connection manner, a first carrier that is continuous in time. As shown in FIG. 2(*b*), a first to a third uplink sub-frames (filled with left diagonal stripes) of an uplink carrier 1, a fourth to a sixth uplink sub-frames (filled with left diagonal stripes) of an uplink carrier 2, and a seventh to a tenth uplink sub-frames of an uplink carrier 3 form the first carrier that is continuous in time, all of the rest uplink sub-frames of the uplink carriers 1, 2, and 3 are used for downlink transmission. The manner in which the first carrier is formed may also be shown in FIG. 2(*c*). Uplink sub-frames that are from the at least two physical carriers form, in an interspersed connection (in a shape of comb teeth) manner, a first carrier that is continuous in time. As shown in FIG. 2(*c*), a second, a fourth, a sixth, an eighth, and a tenth uplink sub-frames of an uplink carrier 1 and a first, a third, a fifth, a seventh, and a ninth uplink sub-frames of an uplink carrier 2 form the first carrier that is continuous in time, and the rest uplink sub-frames of the uplink carriers 1 and 2 are used for downlink transmission. The manner in which the first carrier is formed may also be any other manner, which needs only to ensure that the first carrier is continuous in time, and the "being continuous in time" refers to that ten sub-frames that forms one radio frame of the first carrier may correspond to one uplink sub-frame of one or more physical carriers of the at least two physical carriers. As shown in FIG. 2(*d*), a fourth uplink sub-frame of the first carrier corresponds to a fourth uplink sub-frame of uplink carriers 1 and 2, and a sixth uplink sub-frame of the first carrier corresponds to a sixth uplink sub-frame of uplink carriers 2 and 3. Preferably, the respective some uplink sub-frames of the at least two physical carriers comprised in the first carrier do not overlap in time, so as to prevent control overheads that may be needed due to time overlapping, as shown in FIG. 2(*c*) and FIG. 2(*d*).

In the apparatus in this embodiment, uplink transmission that uses the first carrier generally comprises: transmission of feedback-associated information, for example, an ACK/NACK message. In addition, an SPA resource and a PRACH resource further need to be configured on a conventional Pcell, and transmission of such information is also faced with a problem that the resources are limited. Therefore, in the apparatus in this embodiment, uplink transmission for which a first carrier is used may also comprise transmission of information associated with SPS and PRACH. The first carrier may also be used, according to traffic statuses of carriers, for partial transmission of other information related to control.

It should be further noted that, the first determining module 420 may determine the first carrier at least according to the traffic statuses of the carriers. For example, generally a carrier resource of a small base station whose frequency is relatively high is selected to form the first carrier, where such carrier resource of the small base station is relatively flexible. In addition, the first determining module 420 may determine the related configuration of the first carrier according to the traffic statuses of the carriers and a service requirement of the user equipment when the user equipment accesses the base station (macro base station/small base station), and according to different roles of the apparatus in this embodiment, the traffic statuses of the carriers may be determined in a manner of communication with another base station (macro base station/small base station).

After the first uplink resource configuration is determined, optionally, first sending module 440 may send the first configuration information in a broadcast manner; or the first configuration information may be directly sent to the at least one user equipment. For example, the first configuration information may be sent to the at least one user equipment in a manner of higher layer signaling, where the higher layer signaling is, for example, radio resource control (RRC) signaling; or the first configuration information may be sent to the at least one user equipment by using a cell base station in which the at least one user equipment is located.

Figure 4B:
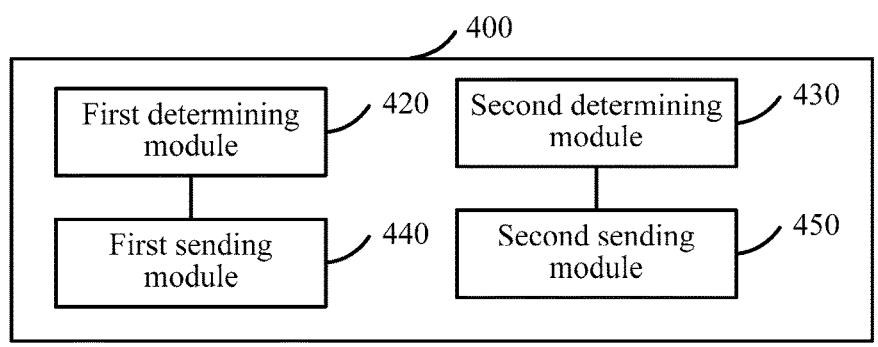

In a configuration solution for the conventional Pcell, generally a carrier of a macro base station is used as a primary carrier to perform control-related or feedback-related uplink transmission, this is because a frequency of a carrier resource of the macro base station is relatively low, and a transmission range is relatively broad. However, compared with uplink transmission of a feedback-related message, for uplink transmission of a control-related message, a transmission frequency is relatively low, and flexibility is not very high. Based on such as reason, in an optional implementation manner of this embodiment, the configuration of the primary carrier (which is referred to as a second carrier in the following) in the configuration solution for the conventional Pcell may still be retained, and the second carrier may be used to bear at least partial message control-related uplink transmission. In such an implementing manner, as shown in FIG. 4(*b*), the apparatus 400 in this embodiment further comprises: a second determining module 430 and a second sending module 450.

The second determining module 430 is configured to determine a second uplink resource configuration associated with a second carrier that performs at least partial uplink transmission with at least one user equipment, wherein the second carrier comprises: all uplink sub-frames of at least one physical carrier.

As shown in FIG. 2(*e*), an uplink carrier 1 and an uplink carrier 2 are macro base station carriers, it is determined that all uplink sub-frames of the uplink carrier 2 are second carriers, and are used to bear at least partial control-related message uplink transmission for all user equipments. First five sub-frames of the uplink carrier 2 and last five sub-frames of the uplink carrier 3 are used as the first carrier, and are used for uplink transmission except the uplink transmission borne by the second carrier.

It should be noted that, the uplink transmission borne by the first carrier and the second carrier may dynamically change according to traffic of the carriers.

The second sending module 450 is configured to send second configuration information associated with the second uplink resource configuration.

Similar to the sending of the first configuration information, in step S250, the second configuration information may be sent in a broadcast manner; or the second configuration information is directly sent to the at least one user equipment; or the second configuration information is sent to the at least one user equipment by using a cell base station in which the at least one user equipment is located.

In summary, by means of the apparatus in this embodiment, a problem that an uplink resource is limited can be effectively resolved, and a resource configuration process is simple.

Figure 5A:
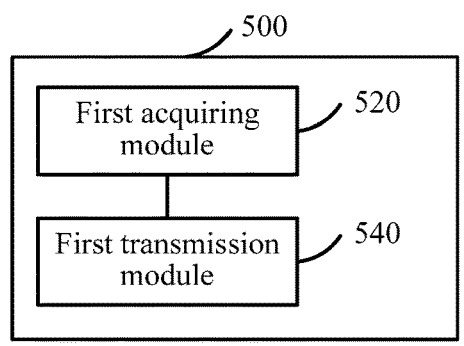
FIG. 5(a) and FIG. 5(b) are structural block diagrams of two examples of an uplink transmission apparatus according to an embodiment of the present application.
Figure 5B:
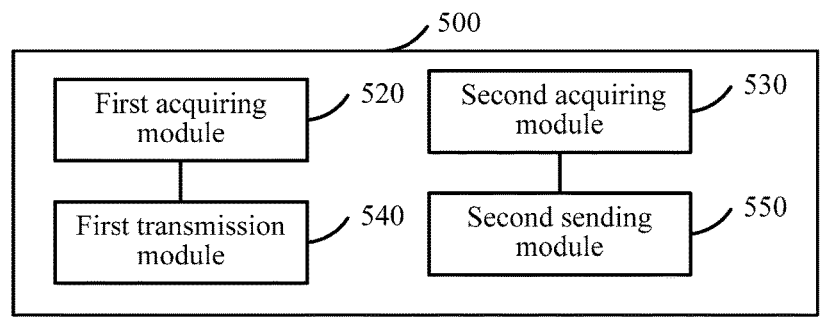

FIG. 5(*a*) is a structural block diagram of an example of an uplink transmission apparatus according to an embodiment of the present application. The apparatus may be or may belong to any user equipment. As shown in FIG. (a), the apparatus 500 comprises:

a first acquiring module 520, configured to acquire first configuration information associated with a first uplink resource configuration associated with a first carrier that performs at least partial uplink transmission, wherein the first carrier comprises: respective some uplink sub-frames of at least two physical carriers, and the first carrier is continuous in time; and a first transmission module 540, configured to perform the at least partial uplink transmission at least according to the first uplink resource configuration.

With reference to the description in FIG. 2(*a*), in the apparatus in this embodiment, the carrier resource, that is, the first carrier, for the user equipment to perform the at least partial uplink transmission is flexibly configured for the base station, and the user equipment is notified in a form of the first configuration information associated with the first uplink resource configuration associated with the first carrier. The first acquiring module 520 acquires such first configuration information is acquired. The first transmission module 540 performs the at least partial uplink transmission according to the first configuration information. In the method in this embodiment, uplink transmission that uses the first carrier generally comprises: transmission of feedback-associated information, for example, an ACK/NACK message. In addition, an SPA resource and a PRACH resource further need to be configured on a conventional Pcell, and transmission of such information is also faced with a problem that the resources are limited. Therefore, in the method in this embodiment, uplink transmission for which a first carrier is used may also comprise transmission of information associated with SPS and PRACH. The first carrier may also be used, according to traffic statuses of carriers, for partial transmission of other information related to control. In addition, such uplink transmission may occur at any time before a next configuration takes effect.

Still with reference to the description in FIG. 4(*b*), in an optional implementing manner of this embodiment, the configuration of the primary carrier (that is, a second carrier) in the configuration solution for the conventional Pcell may still be retained, and the second carrier may be used to bear at least partial message control-related uplink transmission. In such an implementing manner, as shown in FIG. 5(*b*), the apparatus 500 in this embodiment further comprises:

a second acquiring module 530, configured to acquire second configuration information associated with a second uplink resource configuration associated with a second carrier that performs at least partial uplink transmission, wherein the second carrier comprises: all uplink sub-frames of at least one physical carrier; and a second sending module 550, configured to perform uplink transmission by using the second carrier according to a traffic status on the first carrier.

It should be noted that, the uplink transmission borne by the first carrier and the second carrier may dynamically change according to traffic of the carriers.

Figure 6:
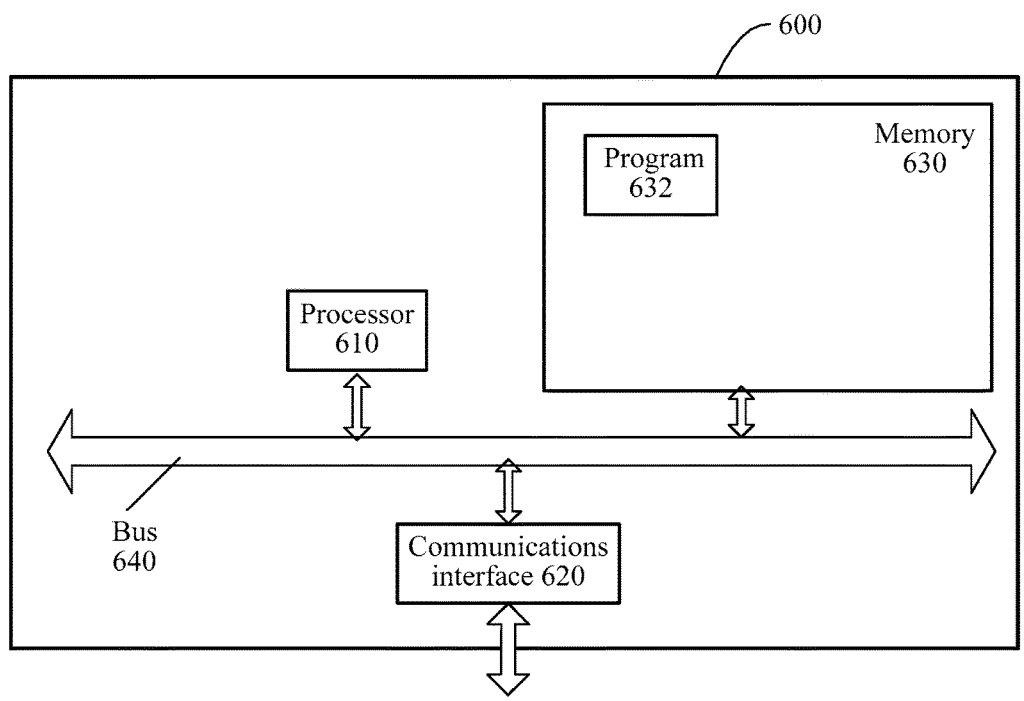
FIG. 6 is a structural block diagram of another example of an uplink resource configuration apparatus according to an embodiment of the present application.

FIG. 6 is a schematic structural diagram of another example of an uplink resource configuration apparatus according to an embodiment of the present application. A specific embodiment of the present application does not limit a specific implementation of the uplink resource configuration apparatus. As shown in FIG. 6, the uplink resource configuration apparatus 600 may comprise:

a processor 610, a communications interface 620, a memory 630, and a communications bus 640, wherein:

the processor 610, the communications interface 620, and the memory 630 communicate with each other by using the communications bus 640;

the communications interface 620 is configured to communicate with a network element such as a client; and the processor 610 is configured to execute a program 632. Specifically, the processor 710 can perform relevant steps in the foregoing method embodiment in FIG. 2(*a*).

Specifically, the program 632 may comprise program code, wherein the program code comprises a computer operation instruction.

The processor 610 may be a central processing unit (CPU), an application specific integrated circuit (ASIC), or one or more integrated circuits configured to implement the embodiments of the present application.

The memory 630 is configured to store the program 632. The memory 630 may comprise a high-speed RAM memory, or may comprise a non-volatile memory, for example, at least one magnetic disk memory. The program 632 may be specifically configured to make the uplink resource configuration apparatus 600 perform the following steps:

determining a first uplink resource configuration associated with a first carrier that performs at least partial uplink transmission with at least one user equipment, wherein the first carrier comprises: respective some uplink sub-frames of at least two physical carriers, and the first carrier is continuous in time; and sending first configuration information associated with the first uplink resource configuration.

For the specific implementation of the steps in the program 632, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

It may be clearly understood by a person skilled in the art that, for the purpose of convenient and brief description, reference may be made to the corresponding description in the foregoing apparatus embodiments for detailed working procedures of the foregoing devices and modules, and details are not described herein again.

Figure 7:
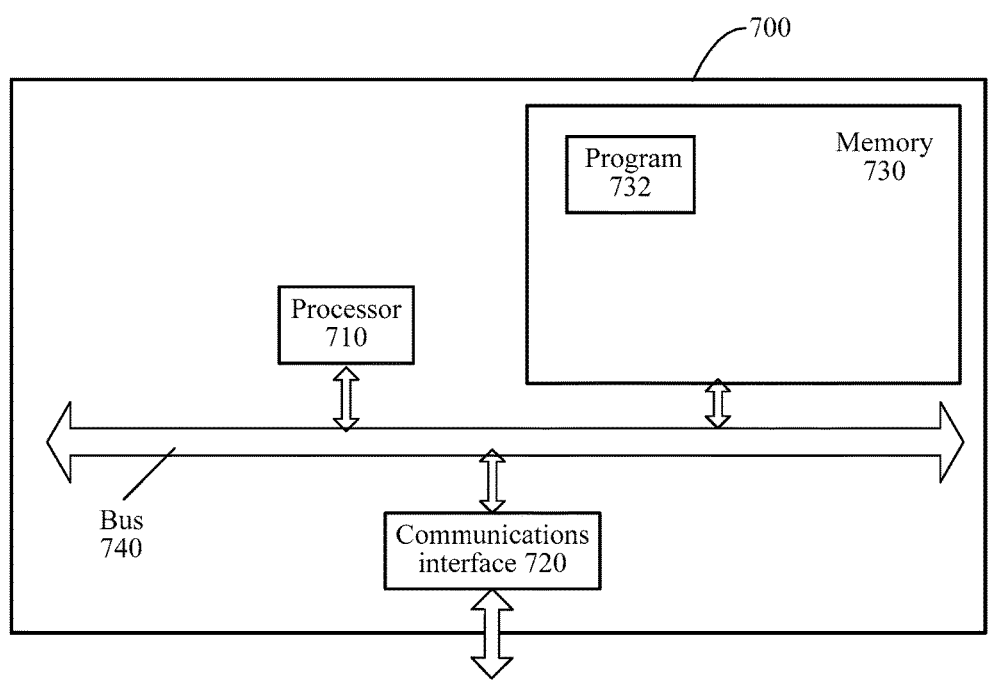
FIG. 7 is a structural block diagram of another example of an uplink transmission apparatus according to an embodiment of the present application.

FIG. 7 is a schematic structural diagram of another example of an uplink transmission apparatus according to an embodiment of the present application. A specific embodiment of the present application does not limit a specific implementation of the uplink transmission apparatus. As shown in FIG. 7, the uplink transmission apparatus 700 may comprise:

a processor 710, a communications interface 720, a memory 730, and a communications bus 740, wherein:

the processor 710, the communications interface 720, and the memory 730 communicate with each other by using the communications bus 740;

the communications interface 720 is configured to communicate with a network element such as a client; and the processor 710 is configured to execute a program 732. Specifically, the processor 710 can perform relevant steps in the foregoing method embodiment in FIG. 3.

Specifically, the program 732 may comprise program code, wherein the program code comprises a computer operation instruction.

The processor 710 may be a CPU, an ASIC, or one or more integrated circuits configured to implement the embodiments of the present application.

The memory 730 is configured to store the program 732. The memory 730 may comprise a high-speed RAM memory, or may comprise a non-volatile memory, for example, at least one magnetic disk memory. The program 732 may be specifically configured to make the uplink transmission apparatus 700 perform the following steps:

acquiring first configuration information associated with a first uplink resource configuration associated with a first carrier that performs at least partial uplink transmission, wherein the first carrier comprises: respective some uplink sub-frames of at least two physical carriers, and the first carrier is continuous in time; and performing the at least partial uplink transmission at least according to the first uplink resource configuration.

For the specific implementation of the steps in the program 732, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

It may be clearly understood by a person skilled in the art that, for the purpose of convenient and brief description, reference may be made to the corresponding description in the foregoing apparatus embodiments for detailed working procedures of the foregoing devices and modules, and details are not described herein again.

Although the invention is described herein in the general context of program modules that execute in conjunction with an application program that runs on an operating system on a computer system, a person skilled in the art will recognize that the invention may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments wherein tasks are performed by remote processing devices linked through a communications network. In a distributed computing environment, program modules may be located in both local and remote memory storage devices.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The above implementations are only used to describe the present invention, rather than limit the present invention; various alterations and variants can be made by those of ordinary skill in the art without departing from the spirit and scope of the present invention, so all equivalent technical solutions also belong to the scope of the present invention, and the scope of patent protection of the present invention should be defined by claims.

What is claimed is:

1. An uplink resource configuration method, wherein the method comprises:

determining a first uplink resource configuration associated with a first carrier that performs at least partial uplink transmission with at least one user equipment, wherein the first carrier comprises respective some uplink sub-frames of at least two physical carriers, the respective some uplink sub-frames being continuous in time, and one or more other uplink sub-frames of the at least two physical carriers are used for downlink transmission;

sending first configuration information associated with the first uplink resource configuration;

determining a second uplink resource configuration associated with a second carrier that performs at least partial uplink transmission with at least one user equipment, wherein the second carrier comprises all uplink sub-frames of at least one physical carrier; and sending second configuration information associated with the second uplink resource configuration.

2. The method of claim 1, wherein the respective some uplink sub-frames of the at least two physical carriers comprised in the first carrier do not overlap in time.

3. The method of claim 1, wherein the determining a first uplink resource configuration associated with a first carrier that performs at least partial uplink transmission with at least one user equipment comprises:

determining the first carrier at least according to traffic statuses of the carriers.

4. The method of claim 1, wherein the sending first configuration information associated with the first uplink resource configuration comprises:

sending the first configuration information in a broadcast manner.

5. The method of claim 1, wherein the sending first configuration information associated with the first uplink resource configuration comprises:

sending the first configuration information to the at least one user equipment.

6. The method of claim 5, wherein the sending the first configuration information to the at least one user equipment comprises:

sending the first configuration information to the at least one user equipment by using a cell base station in which the at least one user equipment is located.

7. The method of claim 1, wherein the at least partial uplink transmission comprises transmission of at least one type of associated information of the following:

Acknowledgment/Negative Acknowledgement information, semi-persistent scheduling, and physical random access channel information.

8. The method of claim 1, wherein the sending second configuration information associated with the second uplink resource configuration comprises:

sending the second configuration information in a broadcast manner.

9. The method of claim 1, wherein the sending second configuration information associated with the second uplink resource configuration comprises:

sending the second configuration information to the at least one user equipment.

10. The method of claim 8, wherein the sending the second configuration information to the at least one user equipment comprises:

sending the second configuration information to the at least one user equipment by using a cell base station in which the at least one user equipment is located.

11. An uplink transmission method, wherein the method comprises:

acquiring first configuration information associated with a first uplink resource configuration associated with a first carrier that performs at least partial uplink transmission, wherein the first carrier comprises respective some uplink sub-frames of at least two physical carriers, the respective some uplink sub-frames being continuous in time, and one or more other uplink sub-frames of the at least two physical carriers are used for downlink transmission;

performing the at least partial uplink transmission at least according to the first uplink resource configuration or the second uplink resource configuration, and acquiring second configuration information associated with a second uplink resource configuration associated with a second carrier that performs at least partial uplink transmission, wherein the second carrier comprises all uplink sub-frames of at least one physical carrier.

12. The method of claim 11, wherein the respective some uplink sub-frames of the at least two physical carriers comprised in the first carrier do not overlap in time.

13. The method of claim 11, wherein the at least partial uplink transmission comprises transmission of at least one type of associated information of the following:

Acknowledgment/Negative Acknowledgement information, semi-persistent scheduling, and physical random access channel information.

14. The method of claim 11, wherein the method further comprises:

performing uplink transmission by using the second carrier according to a traffic status on the first carrier.

15. A non-transitory computer-readable storage medium configured with instructions executable by one or more processors to cause the one or more processors to perform operations comprising:

determining a first uplink resource configuration associated with a first carrier that performs at least partial uplink transmission with at least one user equipment, wherein the first carrier comprises respective some uplink sub-frames of at least two physical carrier, the respective some uplink sub-frames being continuous in time, and one or more other uplink sub-frames of the at least two physical carriers are used for downlink transmission;

sending first configuration information associated with the first uplink resource configuration;

determining a second uplink resource configuration associated with a second carrier that performs at least partial uplink transmission with at least one user equipment, wherein the second carrier comprises all uplink sub-frames of at least one physical carrier; and sending second configuration information associated with the second uplink resource configuration.

16. An uplink resource configuration apparatus, wherein the apparatus comprises:

a transceiver;

a memory storing an instruction; and a processor executing the instruction stored in the memory, wherein the instruction causes the processor to perform operations including:

determining a first uplink resource configuration associated with a first carrier that performs at least partial uplink transmission with at least one user equipment, wherein the first carrier comprises respective some uplink sub-frames of at least two physical carriers, the respective some uplink sub-frames being continuous in time, and one or more other uplink sub-frames of the at least two physical carriers are used for downlink transmission;

sending, by using the transceiver, first configuration information associated with the first uplink resource configuration;

determining a second uplink resource configuration associated with a second carrier that performs at least partial uplink transmission with at least one user equipment, wherein the second carrier comprises all uplink sub-frames of at least one physical carrier; and sending second configuration information associated with the second uplink resource configuration.

17. The apparatus of claim 16, wherein the operations further comprise: sending the first configuration information in a broadcast manner.

18. The apparatus of claim 16, wherein the operations further comprise: sending the first configuration information to the at least one user equipment.

19. The apparatus of claim 18, wherein the operations further comprise: sending the first configuration information to the at least one user equipment by using a cell base station in which the at least one user equipment is located.

20. The apparatus of claim 16, wherein the operations further comprise: sending the second configuration information in a broadcast manner.

21. The apparatus of claim 16, wherein the operations further comprise: sending the second configuration information to the at least one user equipment.

22. The apparatus of claim 21, wherein the operations further comprise: sending the second configuration information to the at least one user equipment by using a cell base station in which the at least one user equipment is located.

23. A non-transitory computer-readable storage medium configured with instructions executable by one or more processors to cause the one or more processors to perform operations comprising:

acquiring first configuration information associated with a first uplink resource configuration associated with a first carrier that performs at least partial uplink transmission, wherein the first carrier comprises respective some uplink sub-frames of at least two physical carriers, the respective some uplink sub-frames being continuous in time, and one or more other uplink sub-frames of the at least two physical carriers are used for downlink transmission;

performing the at least partial uplink transmission at least according to the first uplink resource configuration;

acquiring second configuration information associated with a second uplink resource configuration associated with a second carrier that performs at least partial uplink transmission, wherein the second carrier comprises: all uplink sub-frames of at least one physical carrier; and performing uplink transmission by using the second carrier according to a traffic status on the first carrier.

24. The apparatus of claim 16, wherein the operations further comprise: determining the first carrier at least according to traffic statuses of the carriers.

25. An uplink transmission apparatus, wherein the apparatus comprises:

a transceiver;

a memory storing an instruction; and a processor executing the instruction stored in the memory, wherein the instruction causes the processor to perform operations include:

acquiring, by using the transceiver, first configuration information associated with a first uplink resource configuration associated with a first carrier that performs at least partial uplink transmission, wherein the first carrier comprises respective some uplink sub-frames of at least two physical carriers, the respective some uplink sub-frames being continuous in time, and one or more other uplink sub-frames of the at least two physical carriers are used for downlink transmission;

performing, by using the transceiver, the at least partial uplink transmission at least according to the first uplink resource configuration;

acquiring second configuration information associated with a second uplink resource configuration associated with a second carrier that performs at least partial uplink transmission, wherein the second carrier comprises all uplink sub-frames of at least one physical carrier; or the second uplink resource configuration; and performing uplink transmission by using the second carrier according to a traffic status on the first carrier.

* * * * *